March 29, 1938.                J. E. FIELDS                    2,112,438
                      BOOSTER FOR PRESSURE REGULATORS
                           Filed Jan. 2, 1937              2 Sheets-Sheet 1

INVENTOR
*J. E. Fields*
BY
ATTORNEY

March 29, 1938.  J. E. FIELDS  2,112,438
BOOSTER FOR PRESSURE REGULATORS
Filed Jan. 2, 1937  2 Sheets-Sheet 2

INVENTOR
J. E. Fields
BY
ATTORNEY

Patented Mar. 29, 1938

2,112,438

UNITED STATES PATENT OFFICE 2,112,438

BOOSTER FOR PRESSURE REGULATORS

James E. Fields, Fresno, Calif., assignor of one-half to John K. Weyant, Fresno, Calif.

Application January 2, 1937, Serial No. 118,769

3 Claims. (Cl. 50—16)

This invention relates to pressure regulators such as are used in connection with gas mains, to reduce the initial pressure in the main to a degree suitable for domestic purposes.

As at present constructed, the low pressure regulators interposed in the main act to automatically maintain the pressure on the discharge side of the regulator and the corresponding portion of the main, at a predetermined low pressure. This low pressure is however maintained only adjacent the regulator and customers tapping the line some distance from the regulator, especially at the peak hours of consumption, do not get a pressure sufficient for the proper operation of their gas burning equipment. This is on account of the rapid withdrawal and consumption of gas at such times and friction loss in the line. If the pressure regulators are set to give a higher pressure in the line some distance from the regulator to counteract the drop at the times of peak loading, such pressure will be higher than is legally permitted when the load is low.

The principal object of my invention therefore is to remedy this objectionable and defective feature of operation by providing a booster attachment or system, applied to and acting on the regulator, by means of which an increase in pressure in the discharge or low pressure chamber of the regulator is provided only when the load is heavy, and which will automatically give the desired additional pressure in the line beyond the regulator in proportion to the load.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
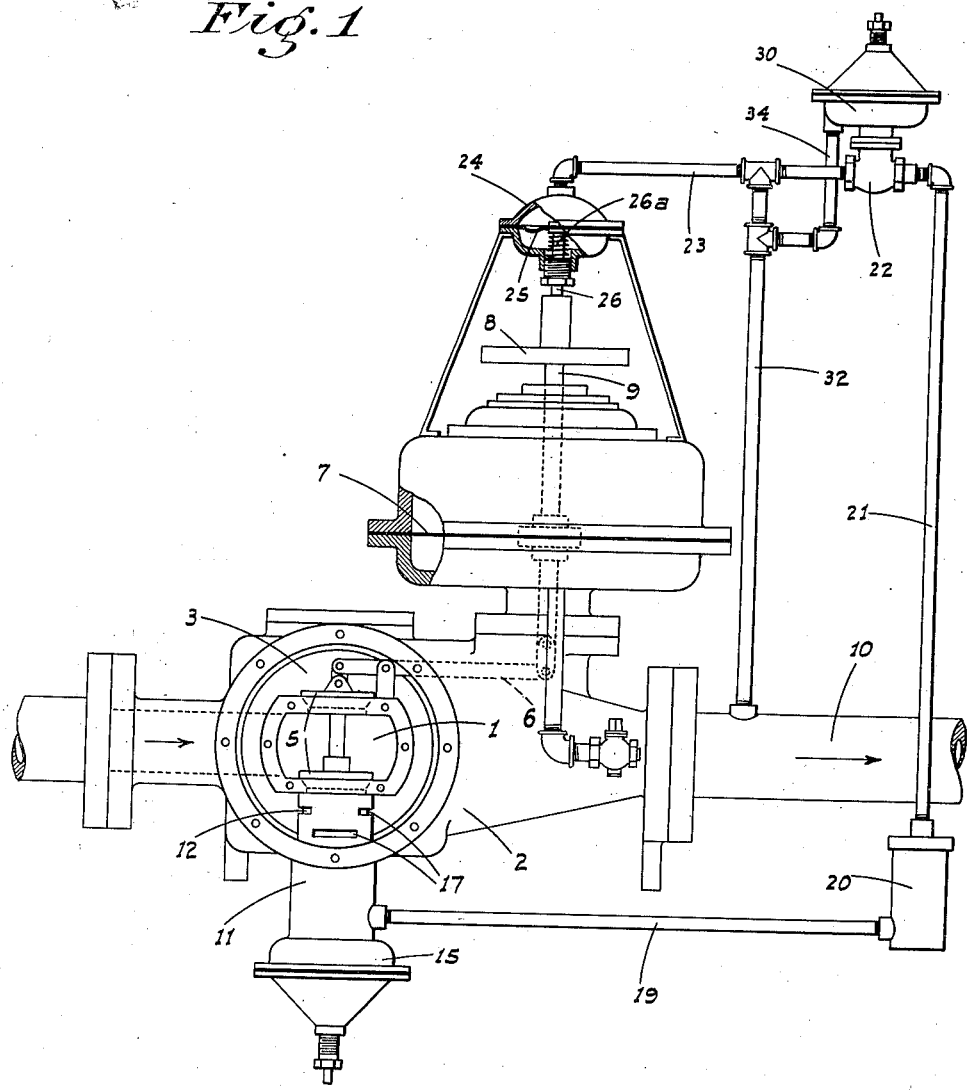
Figure 1 is a side elevation of my booster system shown in connection with a gas line and standard pressure regulator, certain parts being broken out and in section.

Referring now more particularly to the characters of reference on the drawings, 1 denotes the high pressure intake chamber of a standard low pressure regulator 2. The flow from this chamber into the low pressure chamber 3 through top and bottom ports 4 is controlled by upwardly opening coupled valves 5. These are connected by a lever 6 to a diaphragm 7 whose underside is exposed to the low pressure chamber and whose upward movement closes the valves. The diaphragm is set to resist such closing movement by gas below a certain pressure, by suitable means such as a weight 8 mounted on the upper end of the diaphragm stem 9. This setting automatically determines the pressure maintained in the discharge side of the regulator and in the adjacent portion of the gas line 10, and the structure described above is standard and in itself forms no part of this invention.

With this construction it is impossible to obtain a higher pressure in the discharge chamber, irrespective of the volume of gas passing through the regulator, unless the weight or other setting device is manually altered. A lower pressure further along the line due to excessive consumption at peak hours, can therefore never be compensated for and the customers drawing from the line some distance from the regulator can never get the proper pressure at such times.

Figure 2:
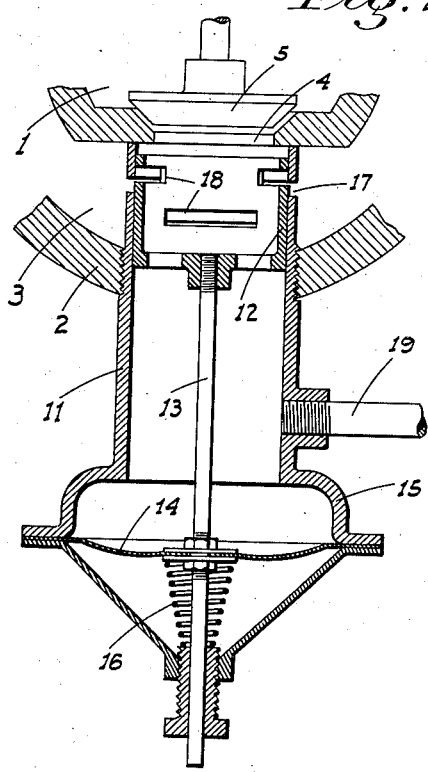
Figures 2 and 3 are sectional elevations of the main booster unit shown when the regulator valve is partly open and wide open respectively.
Figure 3:
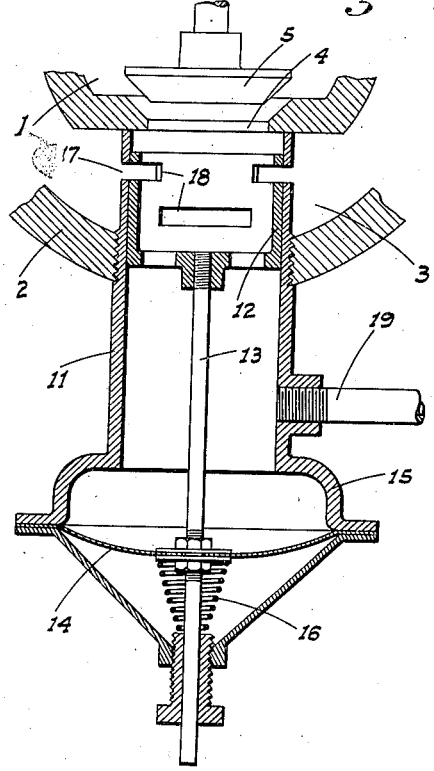

My booster attachment or system which overcomes this defect is constructed as follows: Projecting through and secured on the bottom wall of the low pressure chamber of the regulator is a cylinder 11 surrounding the bottom port 4 and having a tight fit with the adjacent wall of the high pressure chamber as shown in Figs. 2 and 3. Slidable in the cylinder is an open-ended piston 12 having a depending stem 13 secured to a diaphragm 14. This diaphragm is disposed in a casing 15 formed at the bottom of the cylinder, upward pressure on the diaphragm being controlled by a manually adjustable spring 16 under the same. The cylinder has relatively large ports 17 communicating with the low pressure chamber 3, and the piston has similar ports 18 to fully register with the ports 17 only when the piston is depressed to its limit of movement and the adjacent valve 5 is wide open. When the piston is at its topmost position or in contact with the bottom wall of the high pressure chamber, the ports are completely out of register or in closed relation with each other.

Figure 4:
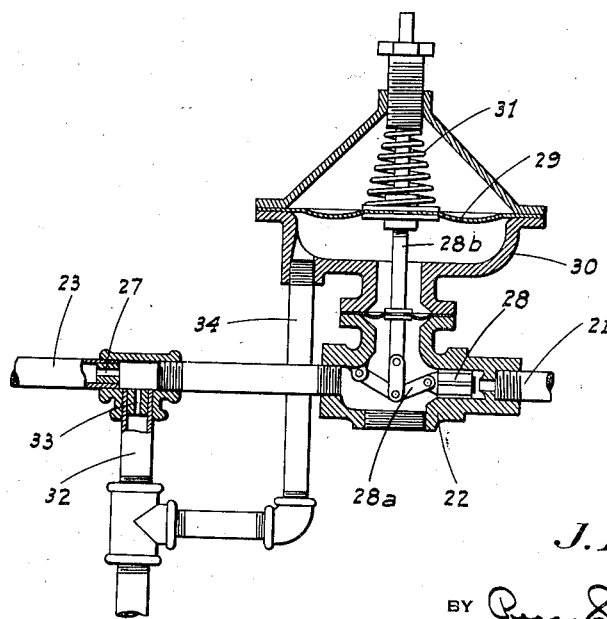
Figure 4 is a sectional elevation of the auxiliary regulating unit of the booster system.

A pipe 19 extends from the cylinder below the piston but above the diaphragm to a filter 20, from which another pipe 21 leads to one side of a valve casing 22. From the other side of this casing another pipe 23 leads to the top of a casing 24 having a diaphragm 25 therein. This latter casing is mounted in fixed connection with the regulator 2 and the diaphragm has a depending stem 26 engaging the upper end of the stem 9 of the regulator diaphragm. A sensitive adjustable spring 26a bears against the under side of diaphragm 25 and enables a fine adjustment for pressure to be obtained in addition to that had by adjustment of spring 16. A restricting or bleed passage member 27 is placed in the pipes 23 between the valve casing 22 and the diaphragm casing 24. (See Fig. 4.)

A piston valve 28 in casing 22, preferably of the piston type, is connected by leverage increasing linkage 28a to a stem 28b. This stem depends from a diaphragm 29 which is disposed in a casing 30 provided as a unit with the valve casing but having no communication with the interior thereof. An adjustable spring 31 acts on the diaphragm tending to open the valve. A pipe 32 leads from a connection with the line 10 adjacent the regulator to a connection with the pipe 23 between the restriction 27 and the valve casing 22; said pipe 32 having a restriction 33 therein adjacent the pipe 23. Another pipe 34 leads from the pipe 32 below the restriction to a connection with the casing 30 below the diaphragm 29, so that gas in said pipe 34 acts on the diaphragm in opposition to the spring 31.

In operation, the diaphragm units of the booster are set to maintain a pressure in the line 10 adjacent the regulator at a predetermined increase over normal when the pressure in the line tends to drop below normal some distance from the regulator, sufficient to maintain said last named pressure at normal. When the load in the line is normal or substantially so, a relatively small volume of gas is flowing through the regulator and the valves 5 are only allowed to open slightly by the low pressure gas acting on the diaphragm 7. Some of the gas entering the regulator and still at its initial high pressure, enters a cylinder 11 through the adjacent port 4 and depresses the diaphragm 14. This will cause the ports 17 and 18 to be opened sufficient to allow practically the entire volume of gas entering said cylinder to flow into the low pressure chamber without any appreciable amount of such gas entering the pipe 19. What little gas does flow through pipes 19 and 21 passes by the valve 28 (normally held open by the spring 31) and enters the diaphragm casing 24 to depress the diaphragm 25 and the stem 26. Due to the restriction 27 however the pressure of this small volume of gas is so reduced that it does not have any actual downward effect on the stem 9 of the diaphragm 7 sufficient to offset the upward pressure of the gas in the regulator acting on said diaphragm from below. Such gas then passes back into the line 10 through the pipe 32 and past the other pressure reducing restriction 33.

When however a heavy drop of gas pressure and volume in the line on the discharge side of the regulator causes the diaphragm 7 to drop and the valves 5 to be more widely opened, high pressure gas in great volume enters the cylinder 11. A certain amount of such high pressure gas unable to escape through the ports 17 and 18, even if the latter were wide open, flows through pipes 19 and 21, past the open valve 28 and into the diaphragm casing 24. The quantity of gas thus entering said casing is sufficient to depress the diaphragm 25 to cause the diaphragm 7 to be depressed against the pressure of gas under the same. This causes the valves 5 to be fully opened allowing of a heavy volume of gas to enter the low pressure chamber, at a pressure greater than that for which the regulator is normally set, so that the pressure in the line some distance from the regulator is boosted to normal.

As soon as this pressure is thus increased in the line adjacent the regulator the gas in the pipe 32 acts to raise the diaphragm 29 against the resistance of the spring 31, so as to close the valve 28. The spring 31 is initially set to cause the valve to be thus closed when any desired pressure has been reached. The gas in the pipe 21 is then prevented from passing to the diaphragm casing 24 and the boosting action at once ceases. When the pressure in the pipe 32 drops with the subsequent return to normal low pressure of the gas in the line 10 adjacent the regulator, the valve 28 again opens ready to again pass gas from the pipe 21 when a subsequent boosting operation is needed.

If the boosting action is not sufficiently rapid it may be increased by tensioning the spring 16. This will require a greater pressure in the cylinder to depress the diaphragm 14 and move the piston to a full port opening position, and allows a greater quantity of such gas to pass through the pipe 19 and connected parts, with a correspondingly great depressing action on the diaphragm stem 9.

It is here to be noted that all the diaphragms of the units of the booster system are designed to be actuated by pre-determined, volumes of gas, so that the booster operation is controlled by and depends on the volume of gas passing through the regulator, at the different pressures for which said units are set, and which may all be altered to suit different conditions by the various adjustment means provided as a part of said units.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A boosting attachment for a fluid pressure regulator, said regulator including high and low pressure chambers having ports therebetween, closure valves for said ports, valve control means including a diaphragm exposed on one side to the low pressure chamber and means acting on the other side of the diaphragm to open the valves in opposition to the fluid pressure acting on the one side of the diaphragm to close the valves; said boosting attachment comprising a fluid actuated unit positioned to act on said other side of the diaphragm, passage means including a take off housing engaging the high pressure chamber and surrounding the outlet side of one of the ports in closing relationship whereby to establish communication between the high pressure chamber and said unit, a valve in said passage means, and valve control means to allow said valve to open only with a reduction in pressure in the low pressure chamber below a predetermined normal.

2. A boosting attachment for a fluid pressure regulator, said regulator including high and low pressure chambers having ports therebetween, closure valves for said ports, valve control means including a diaphragm exposed on one side to the low pressure chamber and means acting on the other side of the diaphragm to open the valves in opposition to the fluid pressure acting on the one side of the diaphragm to close the valves; said boosting attachment comprising a fluid actuated unit positioned to act on the said other side of the diaphragm, passage means including a take off housing engaging the high pressure chamber and surrounding the outlet side of one of the ports in closing relationship whereby to establish communication between the high pressure chamber and said unit, a valve in said passage means, a diaphragm attached to the valve, a casing enclosing one face of the diaphragm, a spring set to resist a predetermined low pressure acting to open the valve and move the diaphragm inwardly of the casing, a pipe leading from the low pressure chamber of the regulator to the casing, another pipe extending between said first named pipe and said passage means at a point in the latter between the valve and the unit, a restriction in said last named pipe, and a restriction in the passage means beyond the point of connection of said last named pipe therewith.

3. A structure as in claim 1 in which said take off housing comprises a cylinder mounted on the regulator and projecting across the low pressure chamber, and in which said passage means includes a pipe leading from the cylinder outwardly of the regulator; an open-ended piston slidable in the cylinder, a diaphragm connected to the piston and mounted in connection with the cylinder beyond the point of connection of said pipe therewith, a spring acting to urge the piston in the direction of the port; the cylinder having a port opening to the low pressure chamber and the piston having a port to register with said cylinder port only after the piston has moved away from the regulator port a predetermined distance.

JAMES E. FIELDS.